Patented Apr. 16, 1929.

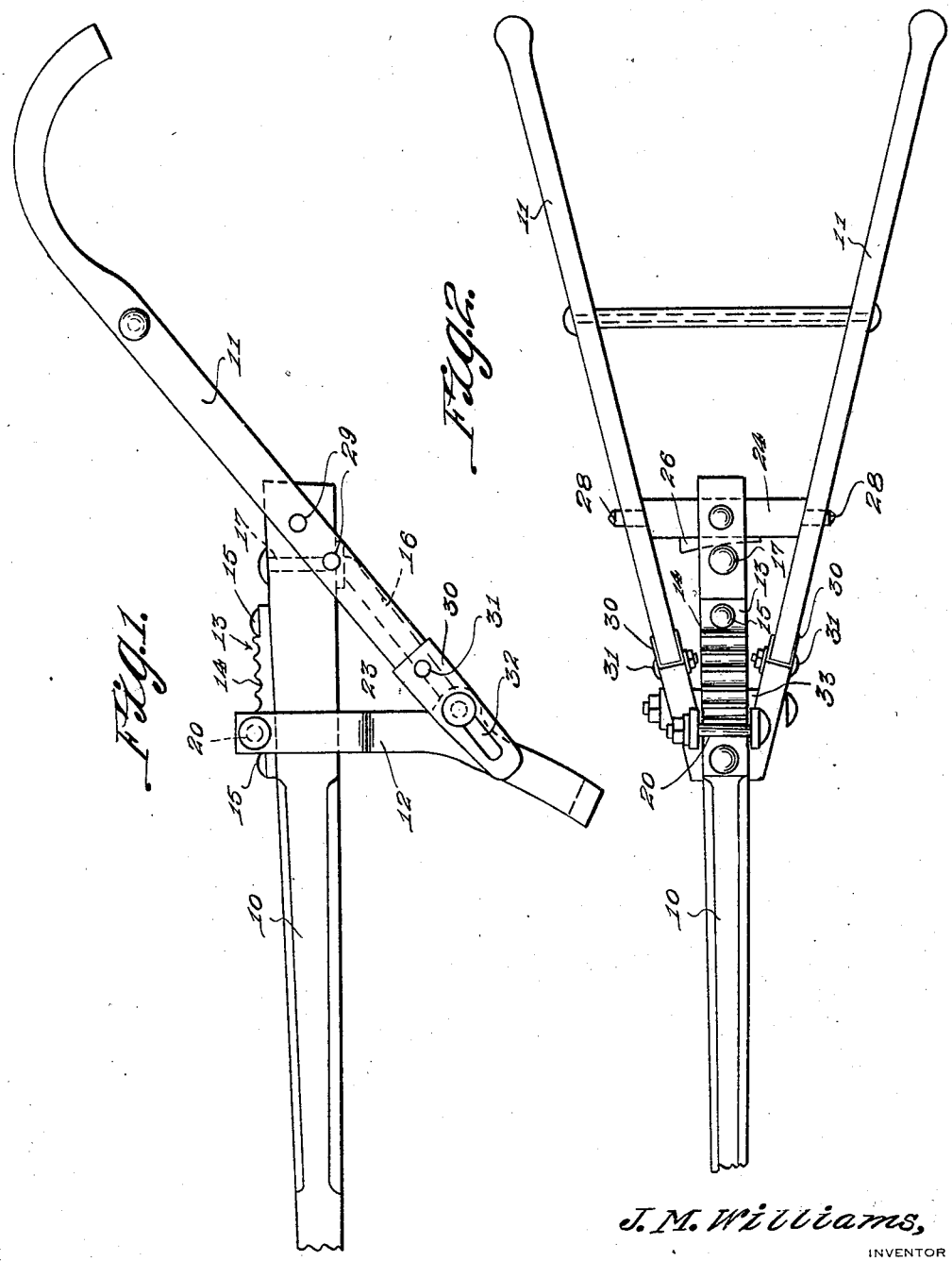

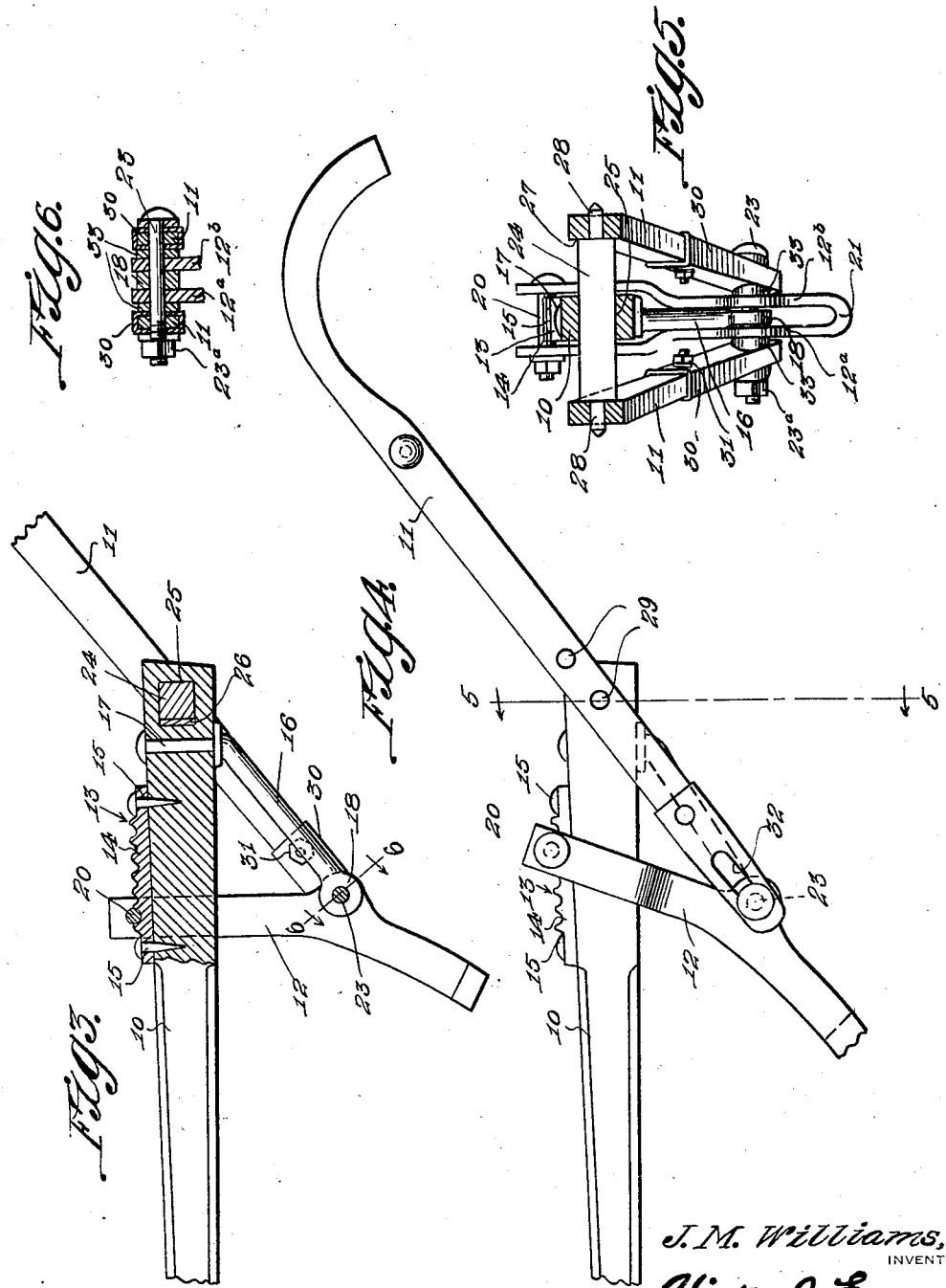

1,709,699

UNITED STATES PATENT OFFICE.

JAMES M. WILLIAMS, OF BARTOW, FLORIDA.

PLOW.

Application filed April 9, 1928. Serial No. 268,610.

The present invention relates to plows and has for its object to provide a plow which may be adjusted to various needs and conditions.

More specifically an object of the invention is to provide a plow in which the plow share may be adjusted at different angles to the beam.

Other objects are simplicity of construction, cheapness of manufacture and simplicity of operation.

Other objects are to facilitate the adjustment of the plow share carrying mechanism to the beam.

In the drawings:—

Figure 1 is a side elevation of a plow made in accordance with my invention, the share being omitted.

Figure 2 is a plan view of the same.

Figure 3 is a side elevation showing a part of the plow structure broken away in order to illustrate details thereof.

Figure 4 is a view similar to Figure 1 showing the parts in a different position of adjustment.

Figure 5 is a section on line 5—5 of Figure 4 looking in the direction of the arrows.

Figure 6 is a section on line 6—6 of Figure 3 looking in the direction of the arrows.

Referring to the drawings in detail, 10 designates the beam of the plow, 11 are the handles, 12 is the foot to which the plow share is attached. The beam 10 is provided toward the rear end thereof with an adjustment plate 13 having a rack 14 formed on the upper surfaces thereof; the adjustment plate may be secured to the beam in any suitable manner as by means of nails 15.

The foot 12 is pivotally supported upon the beam by means of an arm 16 which is bolted to the beam as shown at 17, the arm extending downwardly from the beam and in a forwardly direction and having an eye 18 formed on the end thereof. The foot 12 is secured to the arm 16 by means of a bolt passing through the eye 18 and through suitable apertures in ears formed with the foot 12. The foot 12 is formed of two parallel strips of iron 12$^a$ and 12$^b$, connected at their upper end by a bolt 20 and at the lower end by a web 21.

Rearwardly extending from the foot members 12$^a$ and 12$^b$ are the ears 22 lying in parallelism and in spaced relation to each other to receive therebetween the eye 18 of the arm 16. The ears 22 have their apertures in alignment with the aperture in the eye and the pivotal connection between the member 12 and the member 16 is provided in the form of a bolt 23 passing through said apertures and said eye. The handles 11 are secured to the beam by means of a supporting cross member 24 which passes through an aperture 25 in the beam and is secured therein against displacement by means of a wedge 26. The cross member 24 is provided with shoulders 27 against which the handles 11 rest and with pins 28 projecting through suitable apertures in said handles. The handles may be provided with more than one of said apertures shown at 29 in Figures 1 and 4.

The lower ends of the handles are encased in sheet iron sheaths 30 which are bolted thereto as shown at 31. The lower ends of said sheaths are provided with elongated slots 32 which are adapted to be located in adjusted position by means of the bolt 23 and the nut 23$^a$ on the end thereof. Suitable washers 33 are provided for the purpose of spacing the foot members 12$^a$ and 12$^b$ from the handle members as shown in Figures 5 and 6.

In adjusting the parts described above, the nut 23$^a$ is loosened on the bolt 23 to permit the turning movement of the foot 12 and the resilience on the supporting arm 16 and the resilience of the members permits the bolt 20 to ride over the ridges of the rack 13 whereby the foot may be adjusted at various angles as shown in Figures 3 and 4. The angular adjustment of the foot is effected in this manner, while the handles may be adjusted to suit various conditions and to adapt them to the use of men of various heights through the bolt 29 and the bolt 23.

It is believed that the operation of the device will be apparent from the above description and that further description of the operation thereof will be unnecessary.

Having described my invention what I claim is:—

A plow of the character described comprising a beam having handles pivotally adjustable relative thereto, said handles having slots formed in the lower end thereof and supporting bracket secured to the beam and having an eye in the lower end thereof, a share supporting foot comprising parallel members having apertured ears extending therefrom and lying in parallel relation to each other, a bolt extending through said eye, the apertures in said ears and through the slots in the lower end of said handle, a bolt extending through the upper ends of said foot members, a rack on the upper surface of said beam, the ridges of which cooperate with said last named bolt for holding the foot in adjusted position.

In testimony whereof I affix my signature.

JAMES M. WILLIAMS.